United States Patent Office 3,228,989
Patented Jan. 11, 1966

3,228,989
ARYL ALKYL THIOETHERS
Walter Reifschneider, Midland, Mich., assignor to Dow Chemical Company, Midland, Mich., a corporation of Delaware
No Drawing. Filed June 27, 1962, Ser. No. 205,517
7 Claims. (Cl. 260—609)

The present invention is directed to thioethers and in particular is directed to novel thioethers corresponding to the formula

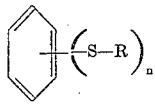

In the present specification and claims, R represents an alkyl group containing from 6 to 24, inclusive, carbon atoms, or a cycloalkyl radical, and $n$ is an integer from 1 to 6, inclusive.

The novel compounds are light colored or colorless oily liquids or crystalline solids, very slightly soluble in water but readily soluble in various common organic solvents such as lower alkanols, benzene and the like. The compounds are useful as insecticides and herbicides, various of them have distinct antiviral activity: as inhibitors of the germination of fungus spores, they are effective fungistats. The compounds are also useful as additives to improve the properties of lubricating oils especially designed for operation under high pressures and temperatures; they are useful as intermediates in the preparation of dyestuffs and biologically active materials; they are also of value as solvent additives in the modification of behavior of mixed solvent systems.

The compounds are prepared by a process which comprises the step of causing a reaction between an aromatic halide compound corresponding to the formula

wherein X represents halogen, and a mercaptan corresponding to the formula

G—S—R wherein G is hydrogen, an alkali metal or cuprous copper. During the reaction to prepare a compound of the present invention, $n$ molecules of mercaptan react with each molecule of aromatic halide. Small amounts of mercaptan may be lost in side reactions. Thus, when it is desired to prepare the present compound in a high state of purity and with a minimum of post-synthesis purification procedure, the starting reactants should be employed in stoichiometric proportions, or preferably, with the mercaptan in slight excess. However, other proportions can be employed if desired, and unconsumed starting material of whatever identity may, if desired, be recycled into further synthesis process.

The reaction goes forward when the reactants are combined at any temperature over a wide range such as from 20° to 350° C., but initiates most readily when reactants are heated to a temperature somewhat higher than room temperature; under these conditions the reaction is, in general, exothermic and goes forward to completion with good yield calculated upon the basis of consumed starting material. Preferred temperatures are from about 50° C. to about 200° C. Hydrogen halide of reaction is evolved and means for its orderly disposal are advantageously provided.

Typically, in the preparation of the compounds of the present invention, reaction between the mercaptan starting material and the aromatic halide starting material will initiate and go forward only when there are jointly employed, as catalytic agent, simultaneously, a catalytic amount of both a source of cuprous ion and a nitrogenous base. Thus, in the preparation of many, and probably all of the present compounds, the employment of such catalyst is essential and critical, although the actual quantity is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed quantity is not critical, but may vary from a very small trace amount, less than 1/100 of 1 mole percent, to as much as an amount equimolecular with either reactant or even greater. In general, the employment of larger amounts is accompanied by no major advantage and, being expensive, is not preferred. When the cuprous salt of the mercaptan is employed, the reaction itself supplies any necessary cuprous ion.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is usually dissolved in inert liquid reaction medium, such as an aliphatic or aromatic hydrocarbon.

The nitrogenous base catalyst substance can, in at least laboratory preparations, be supplied in sufficient excess that portions of it may also act as hydrogen halide acceptor and yet further portions may continue to function, unreacted, in the necessary catalytic manner.

In carrying out the reaction to prepare the compounds of the present invention, the aromatic halide and the mercaptan are intimately mixed and blended, in any order and in desired amounts, with source of cuprous ion and nitrogenous base as hereinbefore described and thereafter heated, to a temperature at which reaction takes place promptly. In one convenient method of practicing the present method, the reaction temperature may be the reflux temperature of the liquid reaction mixture. In this situation, heating may be continued at the boiling temperature of the reaction mixture and under reflux for a period of time to carry the reaction to completion. When a reaction such as a lower aliphatic amine is so volatile that refluxing is impractical, it may be added, slowly, portionwise, to the other reactants at reaction temperature. It is advantageous that the resulting mixture be stirred during reaction time.

Upon completion of the reaction, the desired compounds of the present invention can be separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate usually forms from which the desired product can be extracted as a solvent-soluble fraction. Representative product extraction solvents include diethyl ether, chlorinated hydrocarbons, and benzene. In any event, the reaction medium or the said precipitate is extracted with solvent, the solvent extract dried over an inert drying agent such as, for example, anhydrous potassium carbonate or the like; the solvent vaporized and removed and the remaining product, if oily, distilled: or, if crystalline, chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—1,4-bis (n-hexylthio)benzene*

A reaction mixture was prepared, consisting of 23.6 grams (0.1 mole) of p-dibromobenzene, 16 grams of cuprous oxide (technical grade) and 25 grams (approximately 0.21 mole) of 1-hexanethiol dispersed in a mixture consisting of 110 milliliters quinoline and 10 milliliters pyridine. The resulting reaction mixture was placed in a flask under reflux, the reflux being equipped with a water trap. In this situation, the reaction mixture was heated at its reflux temperature (a pot temperature between approximately 200 and 240° C.) for 6 hours to carry the reaction to completion. At the end of this reaction period, the resulting hot mixture was poured into a mixture of shaved ice and excess concentrated hydrochloric acid. As a result of these procedures, the ice melted and basic substances reacted with hydrochloric acid; in the resulting acidified water a precipitate formed. The precipitate was collected by filtration and was extracted with ether, the ether extract liquid being saved. This liquid was dried over a bed of anhydrous potassium carbonate which also neutralized remaining traces of acidic substances; the resutling liquid was warmed to vaporize and remove ether solvent and obtain a residual oil. This oil crysallized upon standing; the crystals were taken up in hot ethanol and precipitated therefrom as the ethanol cooled, to obtain 13 grams of 1,4-bis(n-hexylthio)-benzene as white crystalline plates having a melting point of 43.5–44.5° C. The yield was 41 percent by weight of starting dibromobenzene which was present in the limiting amount.

The compound of the present example is useful as an insecticide for the control of domestic insects. The application of a water dispersion containing 0.5 gram of the said compound as sole toxicant per 100 milliliters of resulting aqueous dispersion to a population of American cockroach resulted in the kill of almsot all of the insects. Also, the use of a thorough wetting spray containing, as sole protective agent, the compound of the present example in the amount of ¼ of 1 percent by weight of resulting aqueous dispersion proved quite effective in the protection of young bean plants from subsequent infestation with a live inoculum of southern bean mosaic virus.

*Example II.—1,4-bis(dodecylthio)benzene*

In procedures essentially similar to the foregoing except that the starting mercaptan employed in an amount approximately twice equimolecular with the p-dibromobenzene was dodecylmercaptan, there was prepared, in good yield, 1,4-bis(dodecylthio)benzene as white crystalline plates readily soluble in 95 percent ethanol and of extremely low solubility in water, melting at 78–79.5° C. The compound was quite effective when employed as sole protective agent for the prevention of subsequent infection of beans with a live inoculum of southern bean mosaic virus.

*Example III.—p-Bis(cyclohexylthio)benzene*

A reaction mixture was prepared consisting of 11.8 grams (0.05 mole) of p-dibromobenzene, 7.2 grams technical cuprous oxide, 12 grams (approximately 0.1 mole) cyclohexanethiol dispersed together in 130 milliliters technical 2,4-lutidine and 60 milliliters quinoline, as mixed liquid reaction medium. The resulting reaction mixture was heated, with stirring, at its boiling temperature and under reflux overnight (approximately 15 hours), the reflux condenser being equipped with a water separator. At the conclusion of the reaction time, the resulting hot mixture was poured directly into a mixture of chipped ice and 200 milliliters concentrated hydrochloric acid. As a result of these procedures, the ice melted and a brown solid separated in the resulting aqueous dispersion. This solid was collected by filtration and a chloroform extract made of it. The chloroform extract was washed twice with 10 percent hydrochloric acid and then dried over potassium carbonate. From the resulting dry chloroform solution, chloroform solvent was evaporated, leaving a white solid which was recrystallized from methanol to obtain 1,4-bis(cyclohexylthio)benzene as white crystals melting at 102–103° C. The yield, after all purification procedures, was 2.6 grams, approximately 17 per cent by weight of starting dibromobenzene (the limiting starting reactant). The product was readily soluble in ethanol and xylene, and of very low solubility in water. When employed as an insecticide, the compound was highly toxic to cockroaches; as a fungicide it gave control of various plant disease fungi.

In similar procedures, using other cycloalkyl mercaptans, there are prepared other such products. For instance, with 6 molecular proportions of sodium cyclopentyl mercaptide and one molecular proportion of hexabromobenzene there is prepared a hexakis(cyclopentylthio-benzene as a crystalline solid.

Also, employing 2 molecular proportions of 2,2,6,6-tetramethylcyclohexanethiol (melting at 36° C.) and 1,4-diiodobenzene there is obtained a 1,4-bis(2,2,6,6-tetramethylcyclohexylthio)benzene.

*Example IV.—p-Bis(t-octylthio)benzene*

A reaction mixture is prepared consisting of approximately 0.05 mole of p-dibromobenzene, 0.1 mole cuprous oxide as the technical grade; approximately 0.1 mole tertiaryoctylmercaptan (1,1,3,3 - tetramethylbutylmercaptan) dispersed together in 130 milliliters technical 2,4-lutidine and 60 milliliters quinoline, as mixed liquid reaction medium. The resulting reaction mixture is heated, with stirring, at its boiling temperature and under reflux overnight (approximately 15 hours), the reflux condenser being equipped with a water separator. At the conclusion of the reaction time, the resulting hot mixture is poured directly into a mixture of chipped ice and 200 milliliters concentrated hydrochloric acid. As a result of these procedures, the ice melts and a brown solid separates in the resulting aqueous dispersion. This solid is collected by filtration and a chloroform extract made of it. The chloroform extract is washed twice with 10 per cent hydrochloric acid and then dried over potassium carbonate. From the resulting dry chloroform solution, chlorform solvent is evaporated, leaving a white solid 1,4-bis(t-octylthio)benzene as a crystalline product having a molecular weight of 366.7. The product is readily soluble in ethanol and xylene, and of very low solubility in water. The compound is toxic to cockroaches; as a fungicide it gives control of various plant disease fungi.

In procedures essentially similar to the foregoing, but employing 1,3,4-tribromobenzene and an amount of the same t-octylmercaptan three times equimolecular therewith, there is prepared a 1,3,4-tris(t-octylthio)-benzene product, also an insecticidal, fungicidal, viscous liquid, essentially insoluble in water but soluble in various organic solvents such as chlorinated hydrocarbons.

*Example V.—1,2,4,5-tetrakis(3,3-dimethylbutylthio)-benzene*

A reaction mixture is prepared consisting essentially of 0.2 mole of 3,3-dimethylbutylmercaptan, 0.05 mole of 1,2,4,5-tetrabromobenzene, and 1 gram cuprous bromide dispersed together in 200 milliliters mixed technical xylidines as hydrogen halide acceptor, catalyst, and liquid reaction medium. The resulting reaction mixture is heated for approximately 18 hours, at its boiling temperature and under reflux and with stirring, to carry the reaction to completion. At the conclusion of the reaction time, the resulting hot mixture is poured directly into a mixture of chipped ice together with 250 milliliters concentrated hydrochloric acid. As a result of these procedures, the ice melts and a dark solid separates in the resulting aqueous dispersion. This solid is collected by filtration and a benzene extract thereof prepared, washed twice with 10 percent hydrochloric acid and dried over potassium carbonate. From the resulting dry benzene solution, benzene solvent is heated and vaporized to obtain a light-colored solid which is recrystallized from isopropanol to obtain white crystals of 1,2,4,5-tetrakis(3,3-dimethylbutylthio)benzene which is a solid at room temperature and has a molecular weight of approximately 543. In the pure form, the product is practically odorless.

*Example VI.—1,4-bis(tetracosylthio)benzene*

A reaction mixture is prepared consisting essentially of 36.8 grams (0.1 mole) of tetracosyl mercaptan, 11.8 grams (0.05 mole) of p-dibromobenzene, and 1 gram cuprous bromide dispersed together in 200 milliliters mixed technical xylidines as hydrogen halide acceptor, catalyst, and liquid reaction medium. The resulting reaction mixture is heated for approximately 18 hours, at its boiling temperature and under reflux and with stirring, to carry the reaction to completion. At the conclusion of the reaction time, the resulting hot mixture is poured directly into a mixture of chipped ice together with 250 milliliters concentrated hydrochloric acid. As a result of these procedures, the ice melts and a dark solid separates in the resulting aqueous dispersion. This solid is collected by filtration and a benzene extract thereof prepared, washed twice with 10 percent hydrochloric acid and dried over potassium carbonate. From the resulting dry benzene solution, benzene solvent is heated and vaporized, leaving a light-colored solid which is recrystallized from isopropanol to obtain white crystals of 1,4-bis(tetracosylthio)benzene which is a solid at room temperature and has a molecular weight of approximately 811.3. In the pure form, the product is practically odorless.

In procedures essentially the same as the foregoing, by the use of appropriate starting materials, other porducts of the present invention are prepared as follows:

From o-dichlorobenzene and an excess above 2 molecular proportions of n-hexylmercaptan, in the presence of cuprous oxide and in liquid lutidine-quinoline mixture, 1,2-bis(n-hexylthio)benzene.

From m-diiodobenzene and 2 molecular proportions of n-octylmercaptan, in the presence of cuprous lactate and in a propanol solution of secondary n-butylamine, 1,-bis(n-octylthio)benzene.

From 1,3,4-trichlorobenzene and an excess above 3 molecular proportions of decylmercaptan (mixed isomers, predominantly normal), in the presence of cuprous phosphate and in liquid N,N-diphentylxylidine, 1,3,4-tris(decylthio) benzene.

From 1,2-dichloro-4-bromobenzene and, firstly, 1 molecular proportion of cyclohexylmercaptan and, secondly, an excess over 2 molecular proportions of normal hexylmercaptan, in the presence of ammoniacal cuprous sulfate and aniline, 1-cyclohexylthio-3,4-bis(n-hexylthio)benzene.

From monofluorobenzene and a molar excess of n-octylmercaptan, in a liquid lutidine-quinoline mixture in the presence of cuprous fluoride, an n-octylthiobenzene.

From hexabromobenzene and 6 molecular proportions of n-heptylmercaptan, in the presence of cupric oxide and in a pyridine-collidine mixture, a hexakis(n-heptylthio)benzene.

From o-dichlorobenzene and an excess above 2 molecular proportions of isohexylmercaptan, in the presence of cuprous oxide and in liquid lutidinequinoline mixture, 1,2-bis(isohexylthio)benzene.

From m-diiodobenzene and 2 molecular proportions of 5,5-dimethylhexylmercaptan, in the presence of cuprous lactate and in a propanol solution of secondary n-butylamine, 1,3-bis(5,5-dimethylhexylthio)benzene.

From 1,2-dichloro-4-bromobenzene and, firstly, 1 molecular proportion of t-butylmercaptan and, secondly, an excess over 2 molecular proportions of 4,4-dimethylhexylmercaptan in the presence of ammoniacal cuprous sulfate and aniline, 1-t-butylthio-3,4-bis(4,4-dimethylhexylthio)benzene.

From an isomeric mixture of di- and tribromobenzenes (predominantly para- and orthodibromobenzene and 1,2,4-tribromobenzene) and a mixed isomeric secondary hexylmercaptan, an isomeric mixture of bis- and tris(sec.-hexylthio)benzenes.

The branched alkyl mercaptans used as starting materials may be difficult to procure as pure, individual isomers above a molecular weight of about 100; however, the present compounds can be prepared by the employment of more easily obtained mixed isomers of higher molecular weight.

Thus, for example, from approximately 6 molecular proportions of a mixed, isomeric secondary and tertiary tridecylmercaptan (apparently an amorphous solid) and one molecular proportion of tetrabromobenzene there is prepared a tetrakis(tridecylthio)benzene of which the tridecyl groups are predominantly mixed secondary and tertiary groups. The product is a pale tan apparently amorphous solid.

From bromobenzene and a mixture of isomeric alkylthiols predominantly tetracosylthiol, a mixed isomeric alkylthiobenzene, predominantly tetracosylthiobenzene.

Many of the mercaptans necessary as starting materials in the practice of the present invention are articles of commerce. Those which are not are readily prepared in known procedures such as, for example, those disclosed in volume 54 of the Journal of the American Chemical Society, pages 1674–1687, and the references there cited. Other methods are well known to those skilled in the art, such as the method of Pieverling. See Liebig's Annallen der Chemie, volume 183, pages 344–359, note especially pages 349 and following. Other methods are well known to those skilled in the art.

I claim:
1. A compound corresponding to the formula

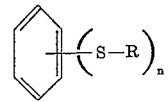

wherein R represents an alkyl group containing from 6 to 24, inclusive, carbon atoms, cyclohexyl, and $n$ is an integer from 2 to 6, inclusive.
2. 1,4-bis(n-hexylthio)benzene.
3. 1,4-bis(dodecylthio)benzene.
4. p-Bis(cyclohexylthio)benzene.
5. p-Bis(1,1,3,3-tetramethylbutylthio)benzene.
6. 1,3,4-tris(1,1,3,3-tetramethylbutylthio)benzene.
7. 1,2,4,5-tetrakis(1,1-dimethylbutylthio)benzene.

References Cited by the Examiner

UNITED STATES PATENTS 3,100,802   8/1963   Reifschneider _____ 260—609

OTHER REFERENCES

Reid, Organic Chemistry of Bivalent Sulfur, vol. II, page 114 (1960).

CHARLES B. PARKER, *Primary Examiner.*

DANIEL D. HORWITZ, *Examiner.*